US012641551B2

(12) United States Patent
Bahadursha et al.

(10) Patent No.: US 12,641,551 B2
(45) Date of Patent: May 26, 2026

(54) DYNAMIC TRANSMIT POWER ADJUSTMENT BASED ON ESTIMATED REFLECTED POWER

(71) Applicant: QUALCOMM Incorporated, San Diego, CA (US)

(72) Inventors: Eswar Venkata Narasimha Muthyala Prasad Bahadursha, Hyderabad (IN); Akash Kumar, Hyderabad (IN); David Loweth Winslow, San Diego, CA (US); Sijut Mehta, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 651 days.

(21) Appl. No.: 18/086,570

(22) Filed: Dec. 21, 2022

(65) Prior Publication Data

US 2024/0214950 A1      Jun. 27, 2024

(51) Int. Cl.
*H04W 4/00*        (2018.01)
*H04W 52/02*       (2009.01)
*H04W 52/36*       (2009.01)
*H04W 72/21*       (2023.01)
*H04W 72/23*       (2023.01)

(52) U.S. Cl.
CPC ..... *H04W 52/367* (2013.01); *H04W 52/0245* (2013.01); *H04W 52/365* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | | |
|---|---|---|---|---|
| 2002/0101907 A1* | 8/2002 | Dent | H04B 1/406 | |
| | | | 375/132 | |
| 2009/0080349 A1* | 3/2009 | Rofougaran | H04W 52/0261 | |
| | | | 370/311 | |
| 2011/0045786 A1* | 2/2011 | Leinonen | H01Q 3/24 | |
| | | | 455/78 | |
| 2011/0045789 A1* | 2/2011 | Sinton | H04W 52/10 | |
| | | | 455/127.1 | |
| 2012/0135777 A1* | 5/2012 | Karpoor | H04W 52/146 | |
| | | | 455/67.11 | |
| 2013/0322562 A1* | 12/2013 | Zhang | H04B 7/0808 | |
| | | | 375/267 | |
| 2014/0009362 A1* | 1/2014 | Ho | H01Q 1/242 | |
| | | | 343/861 | |
| 2016/0233580 A1* | 8/2016 | Aparin | H04B 17/13 | |
| 2018/0097480 A1* | 4/2018 | Hamparian | H04B 1/0458 | |
| 2020/0267662 A1* | 8/2020 | Godala | H04W 52/367 | |
| 2024/0147383 A1* | 5/2024 | Anderson | H04W 52/367 | |

* cited by examiner

*Primary Examiner* — Bob A Phunkulh
(74) *Attorney, Agent, or Firm* — Seyfarth Shaw LLP

(57) ABSTRACT

A method for wireless communication by a user equipment (UE) includes measuring changes in impedance at an antenna. The method also includes estimating an amount of power reflected from the antenna based on the measured changes in impedance at the antenna, in order to obtain an estimated amount of radiated power. The method further includes dynamically increasing a transmit power of the UE, based on the estimated amount of radiated power, up to a limit.

22 Claims, 5 Drawing Sheets

500 ⟶

MEASURE CHANGES IN IMPEDANCE AT AN ANTENNA — 502

ESTIMATE AN AMOUNT OF POWER REFLECTED FROM THE ANTENNA BASED ON THE MEASURED CHANGES IN IMPEDANCE AT THE ANTENNA, IN ORDER TO OBTAIN AN ESTIMATED AMOUNT OF RADIATED POWER — 504

DYNAMICALLY INCREASE A TRANSMIT POWER OF THE UE, BASED ON THE ESTIMATED AMOUNT OF RADIATED POWER, UP TO A LIMIT — 506

500

MEASURE CHANGES IN IMPEDANCE AT AN ANTENNA — 502

ESTIMATE AN AMOUNT OF POWER REFLECTED FROM THE ANTENNA BASED ON THE MEASURED CHANGES IN IMPEDANCE AT THE ANTENNA, IN ORDER TO OBTAIN AN ESTIMATED AMOUNT OF RADIATED POWER — 504

DYNAMICALLY INCREASE A TRANSMIT POWER OF THE UE, BASED ON THE ESTIMATED AMOUNT OF RADIATED POWER, UP TO A LIMIT — 506

DYNAMIC TRANSMIT POWER ADJUSTMENT BASED ON ESTIMATED REFLECTED POWER

FIELD OF THE DISCLOSURE

The present disclosure relates generally to wireless communications, and more specifically to dynamically adjusting transmit power based on estimated reflected power.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IOT) and enhanced machine-type communications (eMTC) are a set of enhancements to LTE for machine type communications.

Mobile devices (e.g., user equipment (UE)) may have different power classes. The different power classes determine a maximum transmit power for the transmit antenna(s) of the UE. For many reasons, not all power delivered to the UE transmit antenna(s) is radiated. Rather, some of the power may be reflected back into the UE. By transmitting at a lower power than what is intended, signals from the UE may not reach intended destinations, or may be received with lower throughput. It would be desirable to compensate for reflected power to allow a UE to transmit with the intended power.

SUMMARY

In aspects of the present disclosure, a method for wireless communication by a user equipment (UE) includes measuring changes in impedance at an antenna. The method also includes estimating an amount of power reflected from the antenna based on the measured changes in impedance at the antenna, in order to obtain an estimated amount of radiated power. The method further includes dynamically increasing a transmit power of the UE, based on the estimated amount of radiated power, up to a limit.

Other aspects of the present disclosure are directed an apparatus. The apparatus has a memory and one or more processors coupled to the memory. The processor(s) is configured to measure changes in impedance at an antenna. The processor(s) is also configured to estimate an amount of power reflected from the antenna based on the measured changes in impedance at the antenna, in order to obtain an estimated amount of radiated power. The processor(s) is further configured to dynamically increase a transmit power of the UE, based on the estimated amount of radiated power, up to a limit.

Other aspects of the present disclosure are directed an apparatus. The apparatus includes means for measuring changes in impedance at an antenna. The apparatus also includes means for estimating an amount of power reflected from the antenna based on the measured changes in impedance at the antenna, in order to obtain an estimated amount of radiated power. The apparatus further includes means for dynamically increasing a transmit power of the UE, based on the estimated amount of radiated power, up to a limit.

In other aspects of the present disclosure, a non-transitory computer-readable medium with program code recorded thereon is disclosed. The program code is executed by a processor and includes program code to measure changes in impedance at an antenna. The program code also includes program code to estimate an amount of power reflected from the antenna based on the measured changes in impedance at the antenna, in order to obtain an estimated amount of radiated power. The program code still further includes program code to dynamically increase a transmit power of the UE, based on the estimated amount of radiated power, up to a limit.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
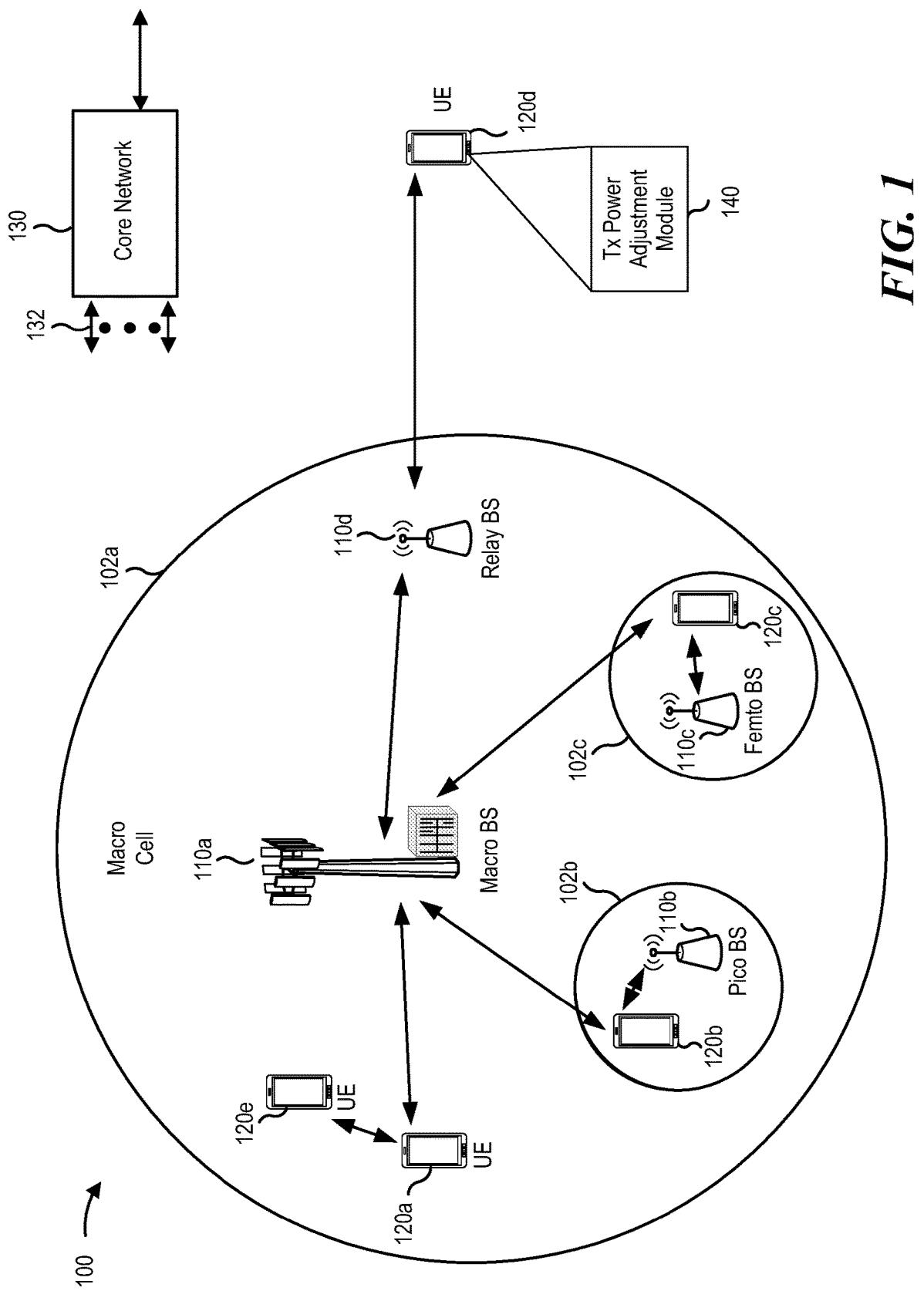
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

3rd Generation Partnership Project (3GPP) defines power classes for mobile units (e.g., user equipment (UEs)). The power classes determine the maximum transmit power at the UE transmit antenna. A link budget for the UE is limited by the uplink due to the low transmit power available from the UE. The link budget defines the cell range.

Currently, a feedback receiver (FBRX) inner loop power control (ILPC) process compensates for any inaccuracies in the UE transmit power by measuring the output power of a power amplifier. The ILPC process is enabled by placing a coupler in a forward position and tapping the output of the coupler. Tapping the output of the coupler, however, does not account for any antenna radiated power loss.

For many reasons, not all of the power delivered to a UE transmit antenna will be radiated. For example, a small UE form factor and incorrect impedance matching at the UE antenna may prevent all power from being radiated. Instead, some power is reflected into the UE. The reflection may impact the UE coverage when the UE is far from the base station by degrading the total radiated power from the UE transmit antenna. Given the loss at the UE transmit antenna, there will be a corresponding reduction in the available power head room (PHR) for the UE, which impacts the UE's throughput. Moreover, different handheld positions of a UE may change a load impedance of the antenna, resulting in higher reflected losses back into the UE.

A voltage standing wave ratio (VSWR) is a measure of how efficiently radio frequency (RF) power is transmitted from a power amplifier over a transmission line to an antenna. VSWR measurements are primarily used for closed loop tuner techniques that feed corresponding tune codes to maximize the radiated power from the antenna by matching impedance. Unfortunately, many mobile devices and wearable devices do not use tuners for all physical antennas due to the cost of the tuners and/or form factor of the devices. For these cases, given the characteristics of the physical antenna, there may be some amount of reflected power that is not radiated from the antenna. The amount of power reflected from the antenna may be based on impedance changes at the antenna.

According to aspects of the present disclosure, when sufficient power head room is available in a UE with higher power calibration, the UE can estimate the power reflected back from the antenna using a VSWR process and offset the VSWR results by dynamically changing the UE transmit power to account for the reflected power from the antenna. In some aspects of the present disclosure, the UE adds this reflected loss to a power headroom (PHR) maximum transit power level (MTPL) to obtain the correct power headroom available for the UE at the transmit antenna. By increasing the UE transmit power by the value that is reflected, and matching the total radiated power with the UE intended transmit power or UE power class level at MTPL conditions, the PHR may be increased. Increasing the PHR improves throughput.

Particular aspects of the subject matter described in this disclosure can be implemented to realize one or more of the following potential advantages. In some examples, the described techniques, such as estimating an amount of reflected power and increasing a transmit power based on the estimated amount of reflected power may increase throughput and improve uplink performance.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a transmit (Tx) power adjustment module 140. For brevity, only one UE 120d is shown as including the Tx power adjustment module 140. The Tx power adjustment module 140 may measure changes in impedance at an antenna. The Tx power adjustment module 140 may also estimate an amount of power reflected from the antenna based on the measured changes in impedance at the antenna, in order to obtain an estimated amount of radiated power. The Tx power adjustment module 140 may further dynamically increase a transmit power of the UE, based on the estimated amount of radiated power, up to a limit.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IOT) devices, and/or may be implemented as NB-IOT (narrow band internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
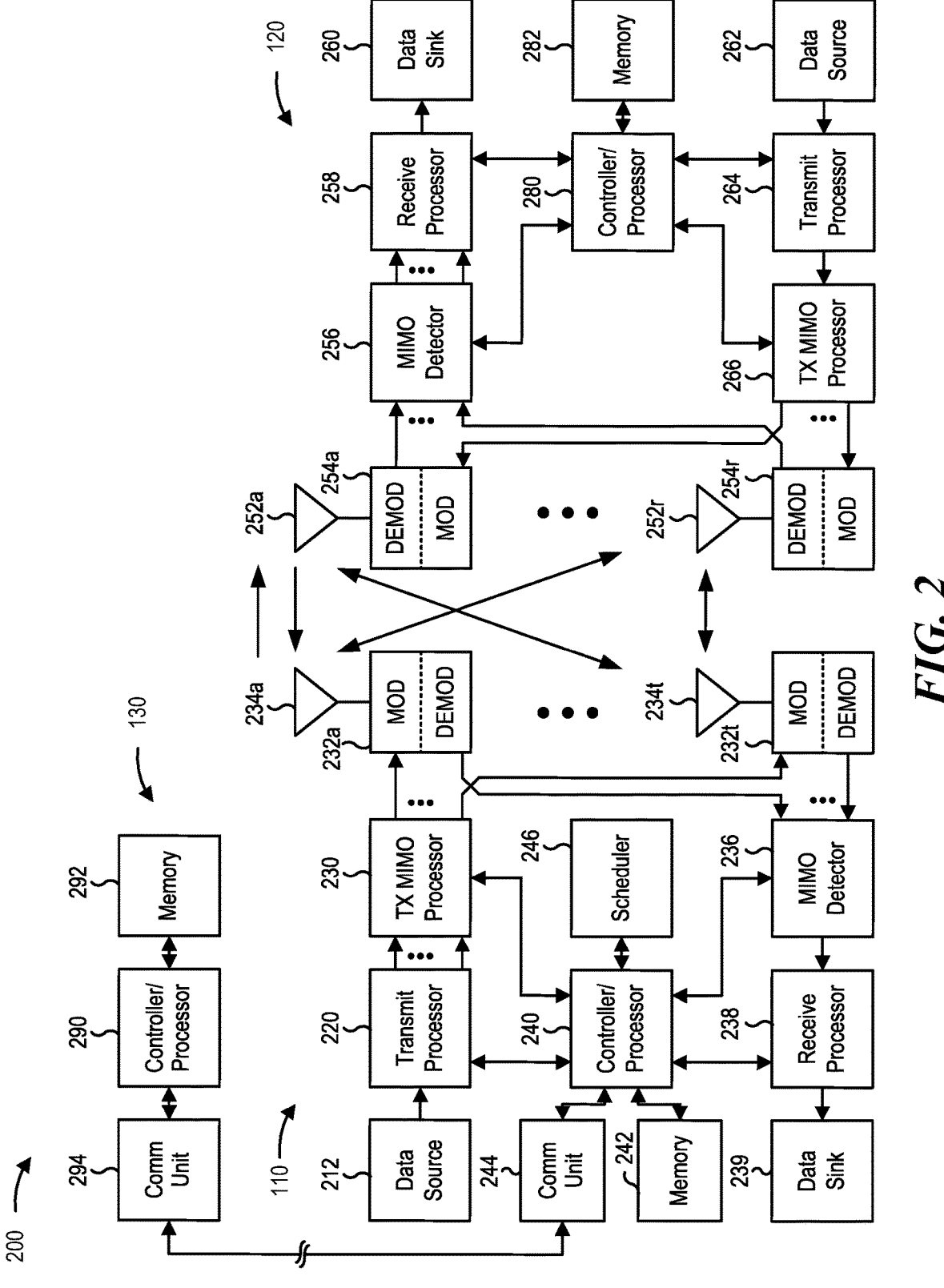
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below; the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 280 of the UE 120, and/or any other component(s) of FIG. 2 may perform one or more techniques associated with transmit power adjustment, as described in more detail elsewhere. For example, the controller/processor 280 of the UE 120, and/or any other component(s) of FIG. 2 may perform or direct operations of, for example, the process of FIG. 5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for measuring, means for estimating, means for dynamically increase, means for adding, and means for adjusting. Such means may include one or more components of the UE 120 or base station 110 described in connection with FIG. 2.

As indicated above, FIG. 2 is provided merely as an example. Other examples may differ from what is described with regard to FIG. 2.

Figure 3:
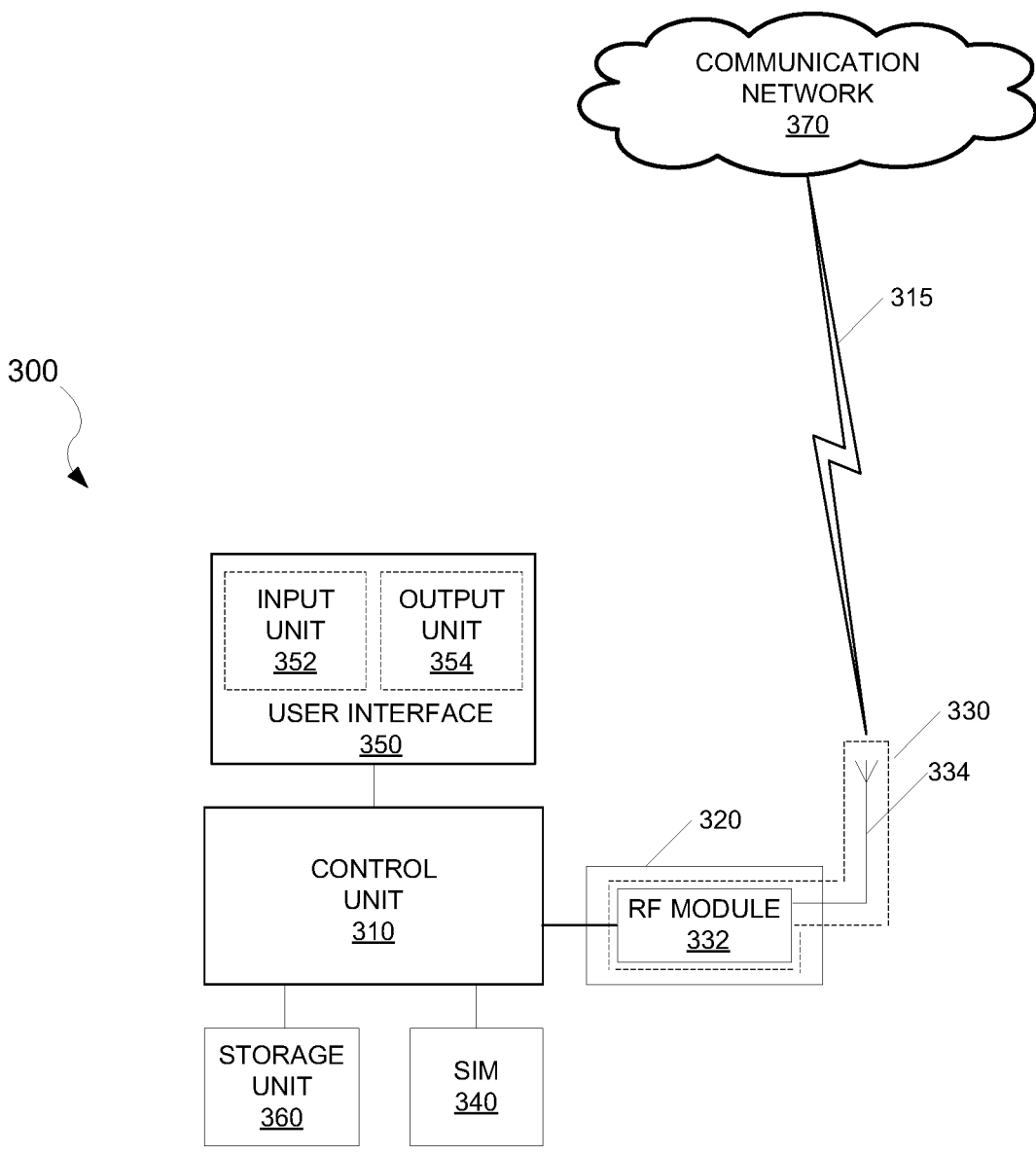
FIG. 3 is a block diagram illustrating an example mobile communication device, in accordance with various aspects of the present disclosure.

FIG. 3 is a block diagram illustrating an exemplary mobile communication device 120, in accordance with aspects of the present disclosure. The mobile communication device 120 may include a control unit 310, a communication unit 320, a subscriber identity module (SIM) 340, a user interface 350, and a storage unit 360.

The mobile communication device 120 may be any device capable of wirelessly communicating with one or more communication networks including, for example, but not limited to, the communication network 370. The mobile communication device 120 may be, for example, but not limited to, a smartphone, a tablet PC, or a laptop computer.

The SIM 340 may associate the communication unit 320 with the subscription 315 on the communication network 370. Although the mobile communication device 120 is shown to include a single SIM (e.g., the SIM 340), a person having ordinary skill in the art can appreciate that the mobile communication device 120 may include additional SIMs without departing from the scope of the present disclosure. The additional SIMs may associate the communication unit 320 with a different subscription on the communication network 370 or a different communication network.

The communication unit 320 may include an RF chain 330. The RF chain 330 may include, for example, but not limited to, an RF module 332 and an antenna 334. Although the mobile communication device 120 is shown to include a single communication unit (e.g., the communication unit 320), a person having ordinary skill in the art can appreciate that the mobile communication device 120 may include additional communication units without departing from the scope of the present disclosure.

The user interface 350 may include an input unit 352. The input unit 352 may be, for example, but not limited to, a keyboard or a touch screen. The user interface 350 may further include an output unit 354. The output unit 354 may be, for example, but not limited to, a liquid crystal display (LCD) or a light emitting diode (LED) display. A person having ordinary skill in the art will appreciate that other types or forms of input and output units may be used without departing from the scope of the present disclosure.

The control unit 310 may be configured to control the overall operation of the mobile communication device 120 including controlling the functions of the communication unit 320 including, for example, but not limited to, frequency synthesis performed by the RF module 332. The control unit 310 may be, for example, but not limited to, a microprocessor (e.g., general-purpose processor, baseband modem processor, etc.) or a microcontroller.

The storage unit 360 may be configured to store application programs, application data, and user data. At least some of the application programs stored at the storage unit 360 may be executed by the control unit 310 for the operation of the mobile communication device 120.

3rd Generation Partnership Project (3GPP) defines power classes for mobile units (e.g., user equipment (UEs)). The power classes determine the maximum transmit power at the UE transmit antenna. For frequency range one (FR1), 3GPP defines two power classes namely PC2 and PC3, where the UE can transmit up to 26 decibel milliwatts (dBm) and 23 dBm, respectively. A link budget for the UE is limited by the uplink due to the low transmit power available from the UE. The link budget defines the cell range.

Currently, a feedback receiver (FBRX) inner loop power control (ILPC) process compensates for any inaccuracies in the UE transmit power by measuring the output power of a power amplifier. The ILPC process is enabled by placing a coupler in a forward position and tapping the output of the coupler. Tapping the output of the coupler, however, does not account for any antenna radiated power loss.

Due to many reasons, not all the power delivered to a UE transmit antenna will be radiated. For example, a small UE form factor and incorrect impedance matching at the antenna may prevent all power from being radiated. Instead, some power is reflected into the UE. The reflection may impact the UE coverage when the UE is far from the base station (far cell scenario) by degrading the total radiated power from the UE transmit antenna. That is, coverage may be degraded when the transmit antenna radiates less power than intended transmit power limits due to reflection of some of that power into the UE. Given the loss at the UE transmit antenna, there will be a corresponding reduction in the available power head room (PHR) for the UE, which impacts the UE's throughput. Moreover, different handheld positions of a UE may change a load impedance of the antenna, resulting in higher reflected losses back into the UE.

A voltage standing wave ratio (VSWR) is a measure of how efficiently radio frequency (RF) power is transmitted from a power amplifier over a transmission line to an antenna. The VSWR is a function of a reflection coefficient that describes the power reflected from the antenna. The VSWR may be represented as follows: $VSWR=(1+|\Gamma|)/(1-|\Gamma|)$, where $\Gamma$ is the reflection coefficient. The reflection coefficient is a ratio of a complex amplitude of the reflected wave to that of the incident wave. The reflection coefficient is also known as return loss. A match between the antenna and the transmission line is improved as a value of the VSWR decreases. Additionally, power delivered to the antenna increases as the value of the VSWR decreases.

A directional coupler is ideally used to separate the incident and reflected wave in a transmission line. The VSWR process calculates both the transmit reference capture and feedback receiver (FBRX) capture to estimate gain and phase.

Figure 4:
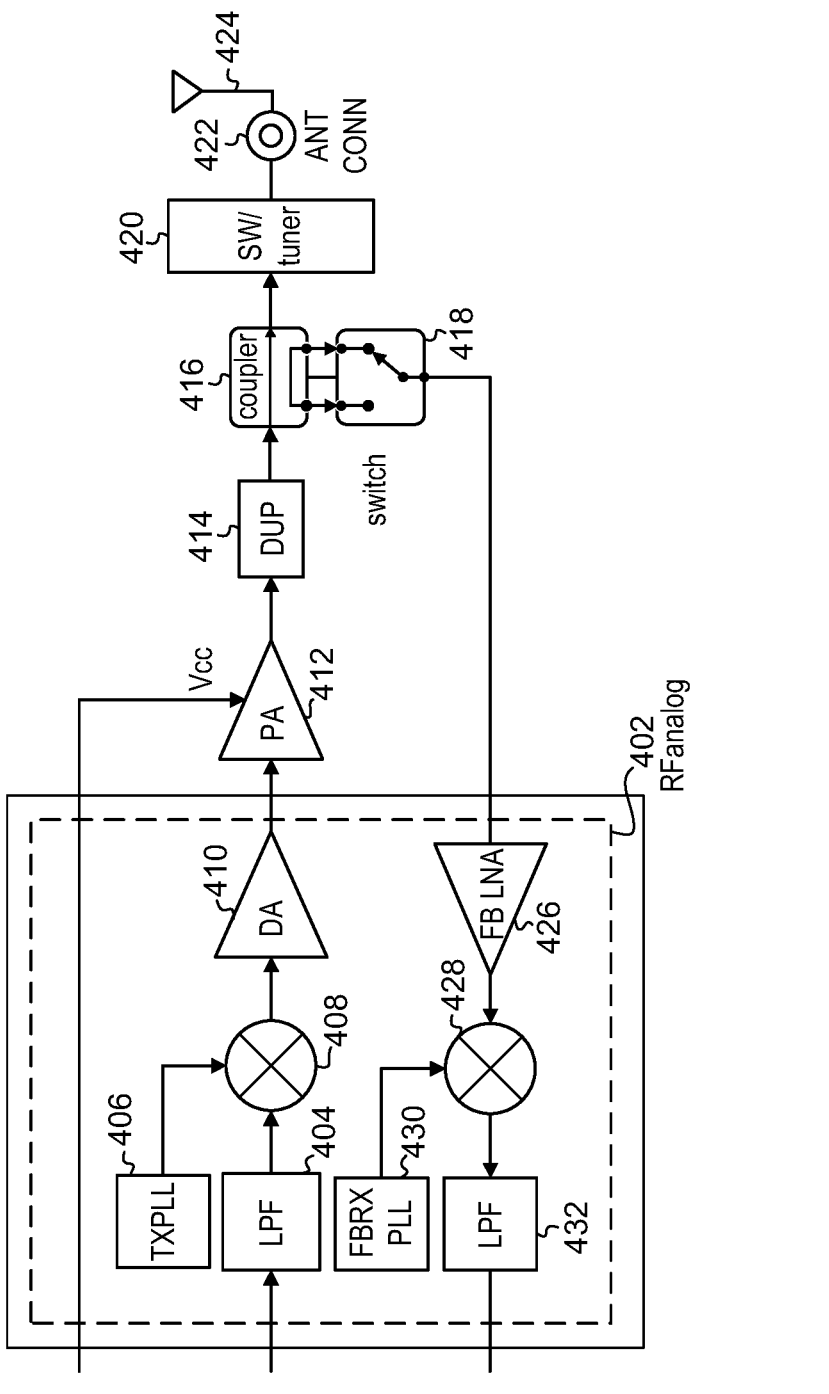
FIG. 4 is a block diagram illustrating a radio frequency (RF) front end, in accordance with various aspects of the present disclosure.

FIG. 4 is a block diagram illustrating a radio frequency (RF) front end, in accordance with various aspects of the present disclosure. In the example of FIG. 4 an analog RF block 402 receives a signal to be transmitted at a low pass filter (LPF) 404, which outputs a filtered signal. The filtered signal is mixed with a signal generated by a transmit phase locked loop (PLL) 406 at a mixer 408. The mixed signal is converted to an analog signal at a digital to analog (DA) converter 410.

A power amplifier (PA) 412 receives the analog signal and a bias voltage/common collector voltage from a power amplifier power manager module, and outputs an amplified signal. A duplexer (DUP) 414 receives the amplified signal. A coupler 416 receives the output from the duplexer 414. A switch 418 is operable in a forward or reverse direction to enable the coupler 416 to capture power sent to an antenna 424 and power reflected from the antenna 424 (e.g., due to impedance mismatch). A switch/tuner 420 receives the output from the coupler 416 and passes the signal to an antenna connection 422 and eventually the antenna 424 for radiating towards a receiver. Any power reflected by the antenna 424 passes through the switch/tuner 420 to be captured at the coupler 416.

The coupler 416 taps the power from the power amplifier 412 intended for the antenna 424 and also the reflected power from the antenna 424. The UE estimates the transmit power with the ILPC process based on the power tapped at the coupler 416. More specifically, a feedback low noise amplifier (LNA) 426 receives the signal from the switch 418 and outputs a signal to a mixer 428. A feedback receiver (FBRX) PLL 430 generates a signal that is mixed with the output of the feedback LNA 426 at the mixer 428. The output of the mixer 428 is received at a low pass filter (LPF) 432, filtered, and then sent from the analog RF block 402 for further processing, such as VSWR processing. Although FIG. 4 shows one possible architecture, the present disclosure is not so limited. Other architectures are also contemplated. For example, the coupler 416 may be integrated into the PA 412 (not shown).

VSWR process measurements are primarily used for closed loop tuner techniques that feed corresponding tune codes to maximize the radiated power from the antenna by matching impedance. Unfortunately, many mobile devices and wearable devices do not use tuners for all physical antennas due to the cost of the tuners and/or form factor of the devices. For these cases, given the characteristics of the physical antenna, there may be some amount of reflected power that is not radiated from the antenna.

When there is sufficient power head room left in a UE with higher power calibration, the UE can estimate the power reflected back from the antenna using the VSWR process and offset the VSWR results by dynamically changing the UE transmit power to account for the reflected power from the antenna. Impedance measurement (e.g., feedback receiver VSWR measurement) may enable the estimations. That is, live measurements are taken of changing impedance, such that the UE actively measures impedance and adjusts transmit power in response to those measurements.

In some aspects of the present disclosure, the UE adds this reflected loss to the PHR maximum transit power level (MTPL) to obtain the correct power headroom available for the UE at the transmit antenna. By increasing the UE transmit power by the value that is reflected and matching the total radiated power with the UE intended transmit power or UE power class level at MTPL conditions, the PHR may be increased. Increasing the PHR improves throughput. The PHR MTPL, or maximum output power, is limited by the power amplifier or transmitter hardware maximum power capability to ensure the output of the hardware remains linear.

In cases where transmit power control is enabled, the UE increases the MTPL by adding a minimum of the reflected power level based on VSWR measurement and the available calibrated PHR value to indicate the correct PHR. As a result, UE throughput is improved. In cases where transmit power control is disabled, the UE adjusts a current transmitted automatic gain control (TXAGC) value along with the MTPL to match the radiated power to the intended transmit power.

According to aspects of the present disclosure, the UE refrains from applying a power correction or MTPL adjustment when the UE reaches a battery voltage (Vbatt) limit or thermal limit. The adjustment or correction is not made in these cases because the power amplifier output power and corresponding power amplifier current values may be affected. Any adjustment or correction has no impact on specific absorption rate (SAR) limits, maximum power reduction (MPR) limits, or additional MPR (AMPR) limits for uplink transmissions because the output is only adjusted to the originally intended power level.

Aspects of the present disclosure apply to reduced capacity (REDCAP) devices, such as wearable devices and other devices with a small form factor. These REDCAP devices have a reduced number of antennas and smaller sized antennas. Additionally, REDCAP devices have fewer power control options available and may or may not have tuners. As a result, closed loop tuning may not be available in response to impedance changes. The total radiated power for REDCAP devices may be less than what is delivered from the power amplifier, especially at low frequencies as used in frequency division duplexing (FDD) bands.

Because REDCAP devices often have no carrier aggregation, higher order multi-input, multi-output (MIMO), or multi-SIM (MSIM) features, a number of radio frequency front end (RFFE) switches for routing the signal is lower. The lower number of RFFE switches reduces the complexity and front end power loss, thereby allowing the power amplifier the additional benefit of more power transfer to the antenna. Implementing the dynamic MTPL adjustment by estimating reflected power from the antenna enables the UE to compensate for the radiated power loss by increasing the UE transmit power by the same amount. Given the smaller number of front-end devices, a feedback receiver of a REDCAP device can estimate the UE reflected power more accurately compared to other devices with higher carrier aggregation (CA) or MIMO processing. The more accurate estimate results from the fact that antenna cross coupling and higher front end loss does not significantly affect the accuracy of the feedback receiver estimates of reflected power for REDCAP devices. During antenna switch diversity (ASDIV) switching scenarios, where each physical antenna may have varying gains and may perform differently, the dynamic MTPL adjustment may offset the radiated power degradation, if any, after antenna switching.

An antenna loading effect occurs with certain hand positions on a UE. When a user's hand is located in certain positions, more power is reflected by the antenna. With the proposed method, the UE can compensate for the power loss resulting from various hand positions by measuring the same reflected power via VSWR and boosting the uplink power by the same amount, given the calibration power headroom. Calibration power headroom places a limit on antenna power. If there is an efficiency difference, such that less power is radiated, the UE may adjust power relative to the calibration power headroom. Boosting uplink power may help in cases where all the antennas are covered by the hand position and there is no available antenna switching option.

In some aspects, characterization or calibration knowledge may be used when adjusting transmit power based on impedance changes resulting from different hand positioning. A baseline calibration/characterization may be obtained for a specific hand position (e.g., such as when no hands are on the UE, that is, free space). A transmit power adjustment may depend on how an RF matching network delivers power to a calibration load (e.g., 50 ohm) impedance, as opposed to free space impedance, as opposed to another (e.g., hand loading) impedance. The UE may adjust power to compensate for the impedance difference from the calibrated (free space or calibration load) case.

By implementing aspects of the present disclosure, the UE may increase its throughput by indicating an accurate amount of available PHR, and may increase its uplink coverage in far cell scenarios. The techniques of the present disclosure are especially applicable to devices with small form factor, such as REDCAP devices, wearable devices, and other internet-of-things (IOT) devices with smaller antennas and low frequency use cases. The techniques may also compensate for impedance changes due to different handheld positions, such as when a UE is operating in a gaming mode, to improve uplink performance.

Figure 5:
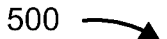
FIG. 5 is a flow diagram illustrating an example process performed, for example, by a user equipment (UE), in accordance with various aspects of the present disclosure.
Figure 5:
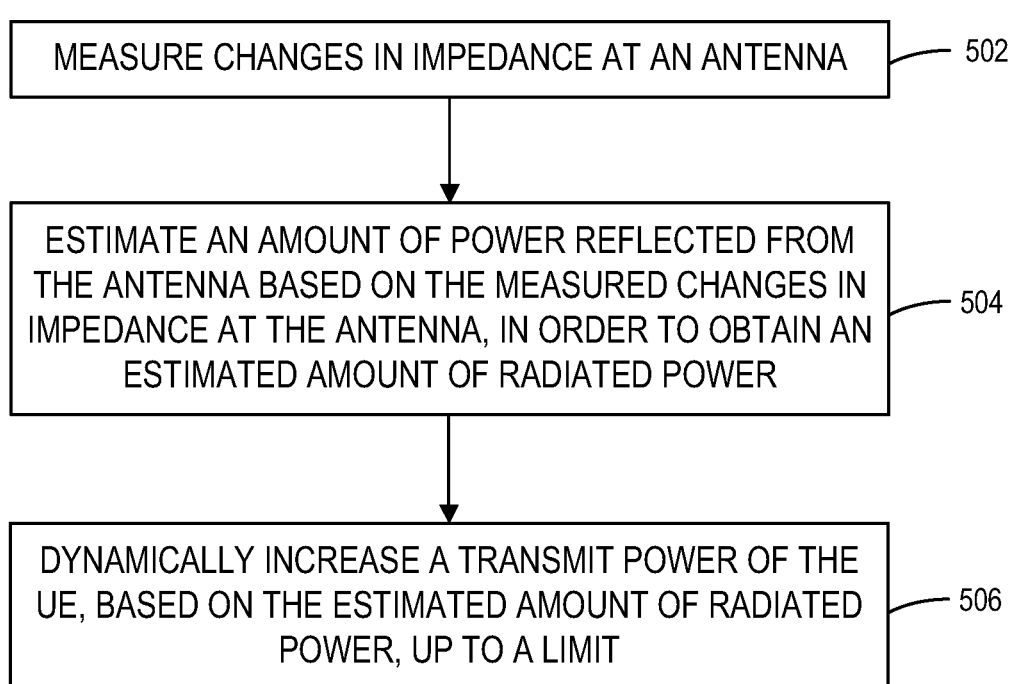

FIG. 5 is a flow diagram illustrating an example process 500 performed, for example, by a user equipment (UE), in accordance with various aspects of the present disclosure. The example process 500 is an example of dynamically adjusting transmit power based on estimated reflected power. The operations of the process 500 may be implemented by a UE 120.

At block 502, the user equipment (UE) measures changes in impedance at an antenna. For example, the UE (e.g., using the controller/processor 280, memory 282, and/or the like) may measure the changes. The changes in impedance may result from hand positioning on the UE.

At block 504, the user equipment (UE) estimates an amount of power reflected from the antenna based on the measured changes in impedance at the antenna, in order to obtain an estimated amount of radiated power. For example, the UE (e.g., using the controller/processor 280, memory 282, and/or the like) may estimate the amount of power. The estimated amount of power reflected from the antenna may be a mismatch loss corresponding to a difference between available power and transmitted power.

At block 506, the user equipment (UE) dynamically increases a transmit power of the UE, based on the estimated amount of radiated power, up to a limit. For example, the UE (e.g., using the controller/processor 280, memory 282, and/or the like) may dynamically increase the transmit power. The limit may be a battery voltage (Vbatt) limit, a thermal limit, and/or a power amplifier (PA) limit.

The dynamic increasing of the transmit power may be based on a difference between a calibrated impedance and a measured impedance associated with a hand position. In some aspects, the UE may also increase a power head room (PHR) maximum transmit power limit (MTPL) based on the estimated amount of radiated power. Increasing the PHR MTPL may include adding to the PHR MTPL a minimum of: available calibrated power head room value and the estimated amount of power reflected, in response to transmit power control being enabled. The UE may adjust a current transmit automatic gain control value, in response to transmit power control being disabled.

EXAMPLE ASPECTS

Aspect 1: A method of wireless communication by a user equipment (UE), comprising: measuring changes in impedance at an antenna: estimating an amount of power reflected from the antenna based on the measured changes in impedance at the antenna, in order to obtain an estimated amount of radiated power; and dynamically increasing a transmit power of the UE, based on the estimated amount of radiated power, up to a limit.

Aspect 2: The method of Aspect 1, further comprising increasing a power head room (PHR) maximum transmit power limit (MTPL) based on the estimated amount of radiated power.

Aspect 3: The method of Aspect 1 or 2, in which increasing the PHR MTPL comprises adding to the PHR MTPL a minimum of: available calibrated power head room value and the estimated amount of power reflected, in response to transmit power control being enabled.

Aspect 4: The method of Aspect 1 or 2, further comprising adjusting a current transmit automatic gain control value, in response to transmit power control being disabled.

Aspect 5: The method of any of the preceding Aspects, in which the estimated amount of power reflected from the antenna comprises a mismatch loss corresponding to a difference between available power and transmitted power.

Aspect 6: The method of any of the preceding Aspects, in which the limit comprises at least one of: a battery voltage (Vbatt) limit, a thermal limit, or a power amplifier (PA) limit.

Aspect 7: The method of any of the preceding Aspects, in which the changes in impedance result from hand positioning on the UE.

Aspect 8: The method of any of the preceding Aspects, in which the dynamically increasing the transmit power is based on a difference between a calibrated impedance and a measured impedance associated with a hand position.

Aspect 9: An apparatus for wireless communication by a user equipment (UE), comprising: a memory: and at least one processor coupled to the memory, the at least one processor configured: to measure changes in impedance at an antenna: to estimate an amount of power reflected from the antenna based on the measured changes in impedance at the antenna, in order to obtain an estimated amount of radiated power: and to dynamically increase a transmit power of the UE, based on the estimated amount of radiated power, up to a limit.

Aspect 10: The apparatus of Aspect 9, in which the at least one processor is further configured to increase a power head room (PHR) maximum transmit power limit (MTPL) based on the estimated amount of radiated power.

Aspect 11: The apparatus of Aspect 9 or 10, in which the at least one processor is further configured to add to the PHR MTPL a minimum of: available calibrated power head room value and the estimated amount of power reflected, in response to transmit power control being enabled.

Aspect 12: The apparatus of any of the Aspects 9-10, in which the at least one processor is further configured to adjust a current transmit automatic gain control value, in response to transmit power control being disabled.

Aspect 13: The apparatus of any of the Aspects 9-12, in which the estimated amount of power reflected from the antenna comprises a mismatch loss corresponding to a difference between available power and transmitted power.

Aspect 14: The apparatus of any of the Aspects 9-13, in which the limit comprises at least one of: a battery voltage (Vbatt) limit, a thermal limit, or a power amplifier (PA) limit.

Aspect 15: The apparatus of any of the Aspects 9-14, in which the changes in impedance result from hand positioning on the UE.

Aspect 16: The apparatus of any of the Aspects 9-15, in which the at least one processor is further configured to dynamically increase the transmit power based on a difference between a calibrated impedance and a measured impedance associated with a hand position.

Aspect 17: An apparatus for wireless communication by a user equipment (UE), comprising: means for measuring changes in impedance at an antenna: means for estimating an amount of power reflected from the antenna based on the measured changes in impedance at the antenna, in order to obtain an estimated amount of radiated power: and means for dynamically increasing a transmit power of the UE, based on the estimated amount of radiated power, up to a limit.

Aspect 18: The apparatus of Aspect 17, further comprising means for increasing a power head room (PHR) maximum transmit power limit (MTPL) based on the estimated amount of radiated power.

Aspect 19: The apparatus of Aspect 17 or 18, in which the means for increasing the PHR MTPL comprises means for adding to the PHR MTPL a minimum of: available calibrated power head room value and the estimated amount of power reflected, in response to transmit power control being enabled.

Aspect 20: The apparatus of any of the Aspects 17-18, further comprising means for adjusting a current transmit automatic gain control value, in response to transmit power control being disabled.

Aspect 21: The apparatus of any of the Aspects 17-20, in which the estimated amount of power reflected from the antenna comprises a mismatch loss corresponding to a difference between available power and transmitted power.

Aspect 22: The apparatus of any of the Aspects 17-21, in which the limit comprises at least one of: a battery voltage (Vbatt) limit, a thermal limit, or a power amplifier (PA) limit.

Aspect 23: The apparatus of any of the Aspects 17-22, in which the changes in impedance result from hand positioning on the UE.

Aspect 24: The apparatus of any of the Aspects 17-23, in which the means for dynamically increasing the transmit power is based on a difference between a calibrated impedance and a measured impedance associated with a hand position.

Aspect 25: A non-transitory computer-readable medium having program code recorded thereon, the program code executed by a processor of a user equipment (UE) and comprising: program code to measure changes in impedance at an antenna; program code to estimate an amount of power reflected from the antenna based on the measured changes in impedance at the antenna, in order to obtain an estimated amount of radiated power: and program code to dynamically increase a transmit power of the UE, based on the estimated amount of radiated power, up to a limit.

Aspect 26: The non-transitory computer-readable medium of Aspect 25, in which the program code further comprises program code to increase a power head room (PHR) maximum transmit power limit (MTPL) based on the estimated amount of radiated power.

Aspect 27: The non-transitory computer-readable medium of Aspect 25 or 26, in which the program code to increase the PHR MTPL comprises program code to add to the PHR MTPL a minimum of: available calibrated power head room value and the estimated amount of power reflected, in response to transmit power control being enabled.

Aspect 28: The non-transitory computer-readable medium of any of the Aspects 25-26, in which the program code further comprises program code to adjust a current transmit automatic gain control value, in response to transmit power control being disabled.

Aspect 29: The non-transitory computer-readable medium of any of the Aspects 25-28, in which the estimated amount of power reflected from the antenna comprises a mismatch loss corresponding to a difference between available power and transmitted power.

Aspect 30: The non-transitory computer-readable medium of any of the Aspects 25-29, in which the limit comprises at least one of: a battery voltage (Vbatt) limit, a thermal limit, or a power amplifier (PA) limit.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
measuring changes in impedance at an antenna;
estimating an amount of power reflected from the antenna based on the measured changes in impedance at the antenna, in order to obtain an estimated amount of radiated power;
increasing a power head room (PHR) maximum transmit power limit (MTPL) based on the estimated amount of radiated power;
adjusting a current transmit automatic gain control value, in response to transmit power control being disabled; and dynamically increasing a transmit power of the UE, based on the estimated amount of radiated power, up to a limit.

2. The method of claim 1, in which increasing the PHR MTPL comprises adding to the PHR MTPL a minimum of: available calibrated power head room value and the estimated amount of power reflected, in response to transmit power control being enabled.

3. The method of claim 1, in which the estimated amount of power reflected from the antenna comprises a mismatch loss corresponding to a difference between available power and transmitted power.

4. The method of claim 1, in which the limit comprises at least one of: a battery voltage (Vbatt) limit, a thermal limit, or a power amplifier (PA) limit.

5. The method of claim 1, in which the changes in impedance result from hand positioning on the UE.

6. The method of claim 5, in which the dynamically increasing the transmit power is based on a difference between a calibrated impedance and a measured impedance associated with a hand position.

7. An apparatus for wireless communication by a user equipment (UE), comprising:
a memory; and
at least one processor coupled to the memory, the at least one processor configured:
to measure changes in impedance at an antenna;
to estimate an amount of power reflected from the antenna based on the measured changes in impedance at the antenna, in order to obtain an estimated amount of radiated power;
to increase a power head room (PHR) maximum transmit power limit (MTPL) based on the estimated amount of radiated power;
to adjust a current transmit automatic gain control value, in response to transmit power control being disabled; and
to dynamically increase a transmit power of the UE, based on the estimated amount of radiated power, up to a limit.

8. The apparatus of claim 7, in which the at least one processor is further configured to add to the PHR MTPL a minimum of: available calibrated power head room value and the estimated amount of power reflected, in response to transmit power control being enabled.

9. The apparatus of claim 7, in which the estimated amount of power reflected from the antenna comprises a mismatch loss corresponding to a difference between available power and transmitted power.

10. The apparatus of claim 7, in which the limit comprises at least one of: a battery voltage (Vbatt) limit, a thermal limit, or a power amplifier (PA) limit.

11. The apparatus of claim 7, in which the changes in impedance result from hand positioning on the UE.

12. The apparatus of claim 11, in which the at least one processor is further configured to dynamically increase the transmit power based on a difference between a calibrated impedance and a measured impedance associated with a hand position.

13. An apparatus for wireless communication by a user equipment (UE), comprising:
means for measuring changes in impedance at an antenna;
means for estimating an amount of power reflected from the antenna based on the measured changes in impedance at the antenna, in order to obtain an estimated amount of radiated power;

means for increasing a power head room (PHR) maximum transmit power limit (MTPL) based on the estimated amount of radiated power;
means for adjusting a current transmit automatic gain control value, in response to transmit power control being disabled; and
means for dynamically increasing a transmit power of the UE, based on the estimated amount of radiated power, up to a limit.

14. The apparatus of claim 13, in which the means for increasing the PHR MTPL comprises means for adding to the PHR MTPL a minimum of: available calibrated power head room value and the estimated amount of power reflected, in response to transmit power control being enabled.

15. The apparatus of claim 13, in which the estimated amount of power reflected from the antenna comprises a mismatch loss corresponding to a difference between available power and transmitted power.

16. The apparatus of claim 13, in which the limit comprises at least one of: a battery voltage (Vbatt) limit, a thermal limit, or a power amplifier (PA) limit.

17. The apparatus of claim 13, in which the changes in impedance result from hand positioning on the UE.

18. The apparatus of claim 17, in which the means for dynamically increasing the transmit power is based on a difference between a calibrated impedance and a measured impedance associated with a hand position.

19. A non-transitory computer-readable medium having program code recorded thereon, the program code executed by a processor of a user equipment (UE) and comprising:
program code to measure changes in impedance at an antenna;
program code to estimate an amount of power reflected from the antenna based on the measured changes in impedance at the antenna, in order to obtain an estimated amount of radiated power;
program code to increase a power head room (PHR) maximum transmit power limit (MTPL) based on the estimated amount of radiated power;
program code to adjust a current transmit automatic gain control value, in response to transmit power control being disabled; and
program code to dynamically increase a transmit power of the UE, based on the estimated amount of radiated power, up to a limit.

20. The non-transitory computer-readable medium of claim 19, in which the program code to increase the PHR MTPL comprises program code to add to the PHR MTPL a minimum of: available calibrated power head room value and the estimated amount of power reflected, in response to transmit power control being enabled.

21. The non-transitory computer-readable medium of claim 19, in which the estimated amount of power reflected from the antenna comprises a mismatch loss corresponding to a difference between available power and transmitted power.

22. The non-transitory computer-readable medium of claim 19, in which the limit comprises at least one of: a battery voltage (Vbatt) limit, a thermal limit, or a power amplifier (PA) limit.

* * * * *